United States Patent [19]
Ohtomo et al.

[11] Patent Number: 5,991,325
[45] Date of Patent: Nov. 23, 1999

[54] LASER BEAM EMITTING APPARATUS AND METHOD OF DRIVING LASER LIGHT SOURCE

[75] Inventors: Fumio Ohtomo; Hiroshi Koizumi; Masayuki Momiuchi; Masahiro Ohishi; Yoshiaki Goto, all of Tokyo, Japan

[73] Assignee: Kabushiki Kaisha TOPCON, Tokyo, Japan

[21] Appl. No.: 08/928,173

[22] Filed: Sep. 12, 1997

[30] Foreign Application Priority Data

Sep. 12, 1996 [JP] Japan .................................. 8-263603

[51] Int. Cl.⁶ ..................................................... H01S 3/09
[52] U.S. Cl. .................. 372/69; 372/22; 372/29; 372/25; 372/38
[58] Field of Search .................. 372/69, 70, 75, 372/25, 22, 29

[56] References Cited

U.S. PATENT DOCUMENTS

| | | | |
|---|---|---|---|
| 4,398,129 | 8/1983 | Logan | 372/25 |
| 5,151,909 | 9/1992 | Davenport et al. | 372/25 |
| 5,265,115 | 11/1993 | Amano | 372/75 |
| 5,363,385 | 11/1994 | Heidemann | 372/70 |
| 5,452,312 | 9/1995 | Yamamoto et al. | 372/22 |
| 5,455,837 | 10/1995 | Negus et al. | 372/69 |
| 5,659,558 | 8/1997 | Tohmon et al. | 372/70 |
| 5,740,194 | 4/1998 | Uchida et al. | 372/75 |
| 5,825,798 | 10/1998 | Momiuchi et al. | 372/22 |

*Primary Examiner*—Leon Scott, Jr.
*Attorney, Agent, or Firm*—Baker & Botts, L.L.P.

[57] ABSTRACT

The present invention relates to a laser beam emitting apparatus using a semiconductor laser or the like and a method of driving a laser light source. An object of the present invention is particularly to provide a laser beam emitting apparatus capable of controlling a laser output with efficiency and a method of driving a laser light source. The laser beam emitting apparatus comprises an optical resonator, the laser light source and pulse driving means. The optical resonator comprises at least a laser crystal and an output mirror. The laser light source pumps the optical resonator and the pulse driving means drives the laser light source. The pulse driving means can change the period and the duty ratio or the like of a drive pulse or pumping pulse so as to control a laser output produced from the laser beam emitting apparatus.

8 Claims, 11 Drawing Sheets time

CURRENT VS. LIGHT OUTPUT
CHARACTERISTIC OF SEMICONDUCTOR
LASER

LASER BEAM EMITTING APPARATUS AND METHOD OF DRIVING LASER LIGHT SOURCE

BACKGROUND OF THE INVENTION

1. Field of the Invention

The present invention relates to a laser beam emitting apparatus using a semiconductor laser or the like and a method of driving a laser light source, and particularly to a laser beam emitting apparatus capable of controlling a laser output with efficiency and a method of driving a laser light source.

2. Description of the Related Art

A laser beam emitting apparatus using a semiconductor laser has been increasing in place of a large laser beam emitting device in recent years.

As light for a point indication or irradiating light for measurement, which is employed in surveying equipment, for example, a semiconductor laser has been used in place of a helium-neon laser emitting device and widely adopted as a battery-operable small and energy-saving light source.

In recent years in particular, a resonator-type laser beam emitting apparatus with a semiconductor laser as a pumping light source has come into being and has been employed even in a surveying device or the like.

The laser beam emitting apparatus, which has been used as the point indication light of the surveying equipment, has heretofore used a red laser beam in terms of its life, stability and economy. However, a resonator-type laser beam emitting apparatus, which emits a green laser beam with a semiconductor laser as a pumping light source, has come on the stage to further improve visibility.

The conventional laser beam emitting apparatus needs to adjust the quantity of laser light for irradiation according to surrounding light and darkness or the distance to an object or the like to be measured. The laser beam emitting apparatus has changed a current inputted to the semiconductor laser used as the pumping light source so as to adjust the quantity of the laser light to be applied.

FIG. 12 shows the relationship between an input current of a semiconductor laser and a laser output thereof. No laser beam is emitted until the input current of the semiconductor laser reaches a threshold current. When the input current of the semiconductor laser exceeds the threshold current, the laser output of the semiconductor laser rises rapidly. Thus, the light emission of the semiconductor laser needs to pass a current exceeding the threshold current in amp.

Even when the laser output is reduced, the passage of the current exceeding the threshold current in amp. through the semiconductor laser is required and the efficiency of the semiconductor laser is reduced.

In the resonator-type laser beam emitting apparatus with the semiconductor laser as the pumping light source, the current used up by the semiconductor laser increases in proportion to the square of a second harmonic generation output as shown in FIG. 13 when the current exceeding the threshold current in amp. is supplied to the semiconductor laser.

Thus, an increase or decrease in current supplied to the semiconductor laser has direct bearing on the operational efficiency of the laser beam emitting apparatus and is of extreme importance for the purpose of providing less power consumption.

Therefore, there has been a strong demand for the appearance of a laser beam emitting apparatus capable of controlling a laser beam output with high efficiency, reducing power consumption and greatly increasing a continuous service time or the like.

SUMMARY OF THE INVENTION

With the foregoing in view, it is therefore an object of the present invention to provide a laser beam emitting apparatus capable of controlling a laser output with efficiency.

According to one aspect of the present invention, there is provided a laser beam emitting apparatus comprising:

an optical resonator composed of at least a laser crystal and an output mirror;

a laser light source for pumping the optical resonator; and pulse driving means for driving the laser light source, and whereby the pulse driving means is capable of changing the period, duty ratio or the like of a drive pulse or pumping pulse to thereby control a laser output produced from the laser beam emitting apparatus.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The drawings shows one embodiment of the present invention wherein:

FIG. 9($b$) is a diagram typically illustrating a gain switch and shows the relationship between the time and the intensity of light;

FIG. 9($c$) is a diagram typically depicting a gain switch and shows the relationship between the time and an inverted population;

FIG. 10($b$) is a diagram for describing the relationship in which the period T of the continuous pulse supplied to the semiconductor laser satisfies the condition that $\tau_{FL}>T-\tau$;

DESCRIPTION OF THE INVENTION

A preferred embodiment of the present invention will hereinafter be described with reference to the accompanying drawings.

Figure 1:
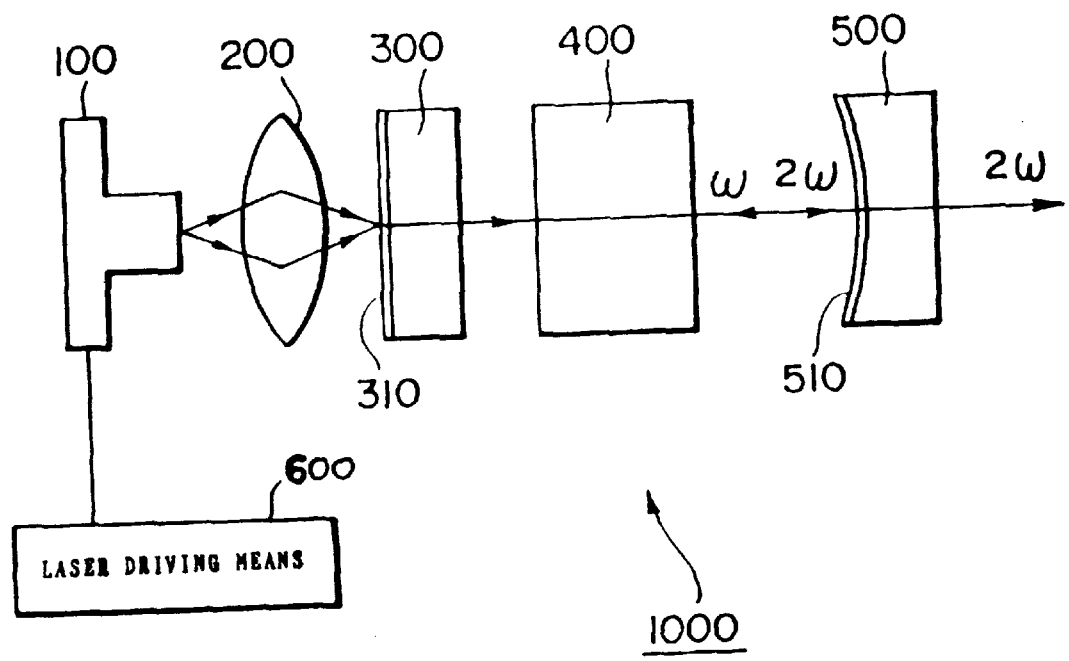
FIG. 1 is a diagram for describing a configuration of a laser beam emitting apparatus according to one embodiment of the present invention.

FIG. 1 shows a laser beam emitting apparatus 1000 according to the present embodiment, which comprises a laser light source 100, a condenser lens 200, a laser crystal 300, a non-linear optical medium 400, an output mirror 500 and a laser driving means 600.

The laser light source 100 is used to generate a laser beam. In the present embodiment, a semiconductor laser is used as the laser light source 100. In the present embodiment, the laser light source 100 functions as a pumping light generator for generating a fundamental wave. Further, the laser driving means 600 is used to drive the laser light source 100. In the present embodiment, the laser driving means 600 is capable of pulse-driving the laser light source 100.

The laser crystal 300 is a medium having a negative temperature and is used to amplify light. YAG (Yttrium Aluminum Garnet) doped with $Nd^{3+}$ ions, or the like is adopted as the laser crystal 300.

A first dielectric reflecting film 310 is formed on the laser light source 100 side of the laser crystal 300.

The output mirror 500 is configured so as to be opposed to the laser crystal 300 with the first dielectric reflecting film 310 formed thereon. The laser crystal 300 side of the output mirror 500 is processed into a shape of a concave spherical mirror having a suitable radius so that a second dielectric reflecting film 510 is formed on the output mirror 500.

The non-linear optical medium 400 is inserted into an optical resonator composed of the first dielectric reflecting film 310 of the laser crystal 300 and the output mirror 500.

When an electric field is applied to a substance, electric polarization is produced. When the electric field is low, the electric polarization is proportional to the electric field. However, the proportionality between the electric field and the polarization is unbalanced in the case of powerful coherent light such as a laser beam. Thus, a non-linear polarized component proportional to the square or cube of the electric field comes about excellently.

Coupling occurs between optical waves having frequencies different from each other due to the non-linear polarized component, so that harmonics doubling the frequency of the optical wave are produced.

Since the non-linear optical medium 400 is inserted into the optical resonator composed of the laser crystal 300 and the output mirror 500, it is called "internal type SHG". Since a converted output is proportional to the square of optical power of the fundamental wave, an effect can be brought about in that a large optical intensity in the optical resonator can be directly used.

Figure 8:
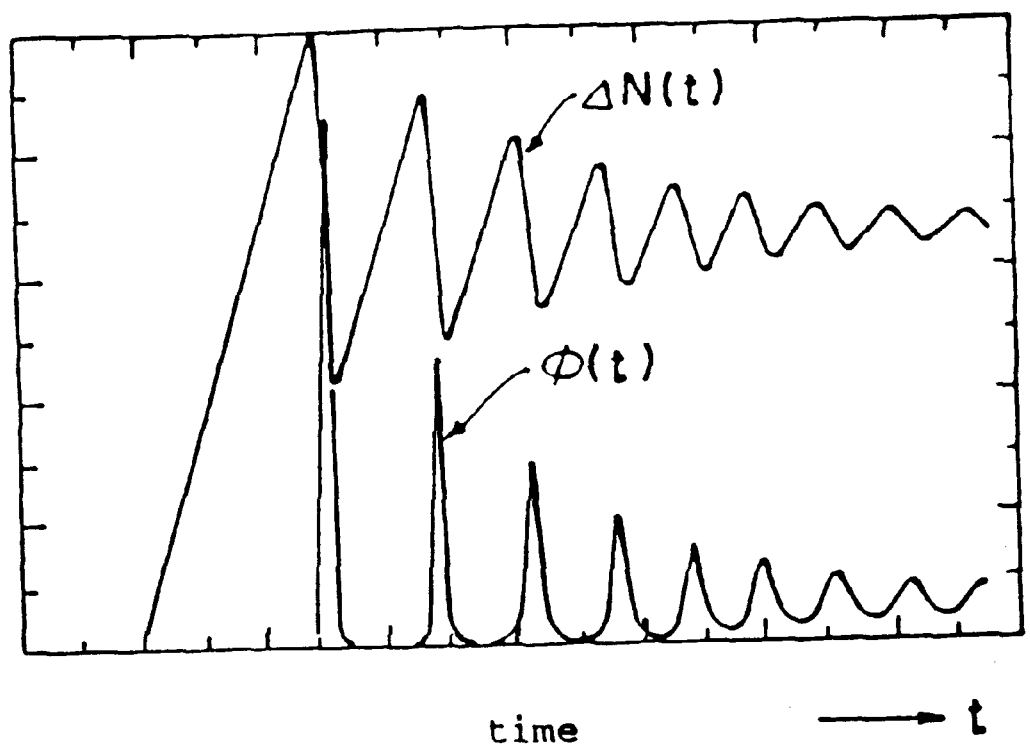
FIG. 8 is a diagram showing the relationship between an inverted population and the intensity of light at the time of relaxation vibrations of a semiconductor laser.

FIG. 8 shows the relationship between an inverted population and the intensity of light at the time of relaxation vibrations of a commonly-used laser light source. A delta N(t) shown in FIG. 8 indicates the inverted population (gain), φ(t) indicates the intensity of light, and the abscissa indicates the elapse of time.

It can be understood from FIG. 8 that when the inverted population reaches the maximum, the initial spike (i.e., first pulse) rises so as to produce the maximum light intensity.

Figure 9A:
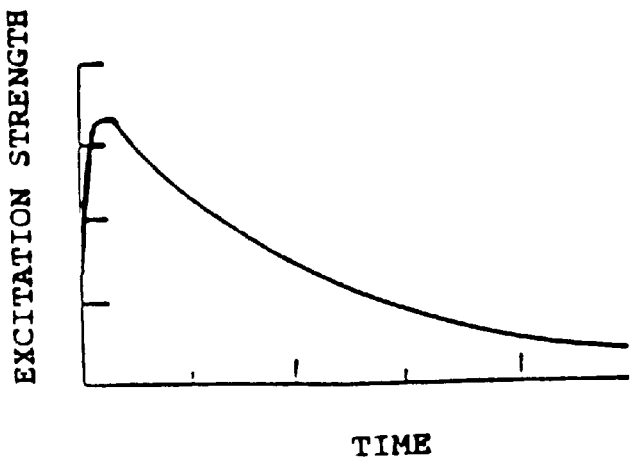
FIG. 9($a$) is a diagram typically showing a gain switch and shows the relationship between the time and the intensity of pumping.
Figure 9B:
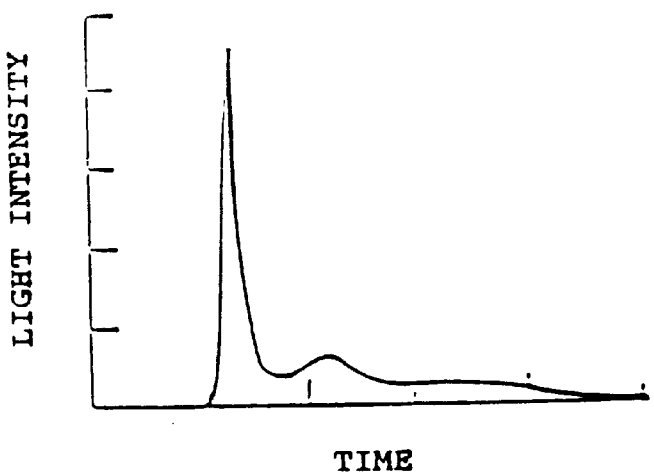
Figure 9C:
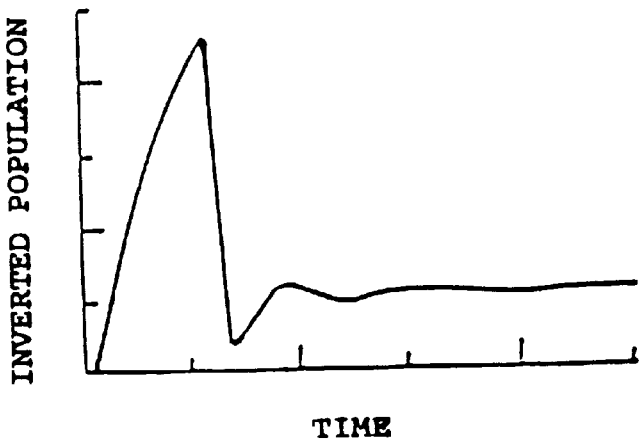

Further, FIGS. 9(a), 9(b) and 9(c) typically show gain switches, respectively, wherein FIG. 9(a) is a diagram showing the relationship between the time and the intensity of pumping, FIG. 9(b) is a diagram showing the relationship between the time and the intensity of light, and FIG. 9(c) is a diagram illustrating the relationship between the time and the inverted population.

If driving power expressed in a continuous wave is supplied to a semiconductor laser, then the maximum light intensity is produced in response to the first pulse. Thereafter, since the light intensity is reduced so as to converge on a predetermined light intensity, the use of the first pulse alone allows the most efficient extraction of light.

A further description will be made of the case in which driving power expressed in a continuous pulse is supplied to a semiconductor laser, referring to FIGS. 10(a) and 10(b).

Incidentally, a drive pulse for driving the semiconductor laser and an optical pulse outputted from the semiconductor laser are substantially identical in period and pulse width to each other.

Figure 10:
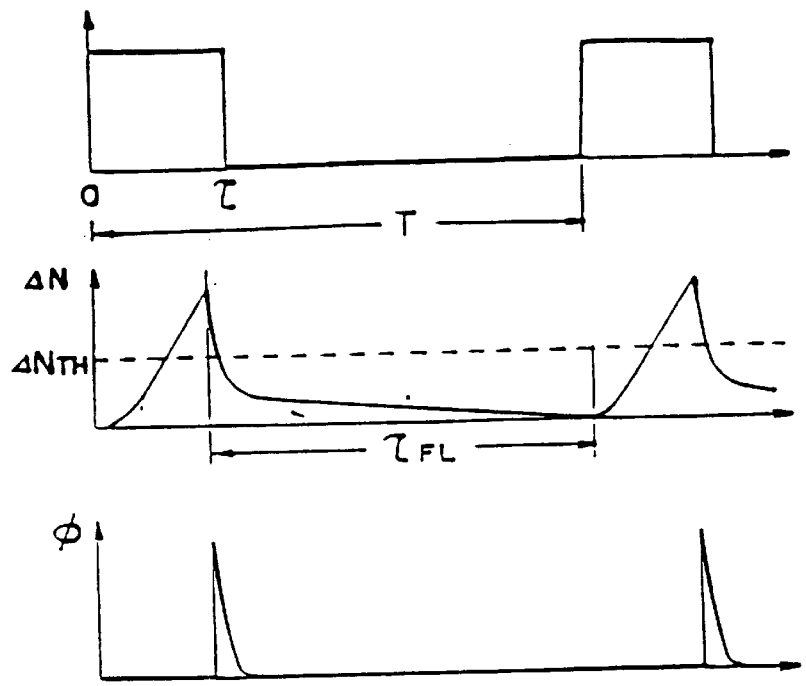
FIG. 10($a$) is a diagram for describing the relationship in which a period T of a continuous pulse supplied to a semiconductor laser satisfies the condition that $\tau_{FL}<T-\tau$.
Figure 10:
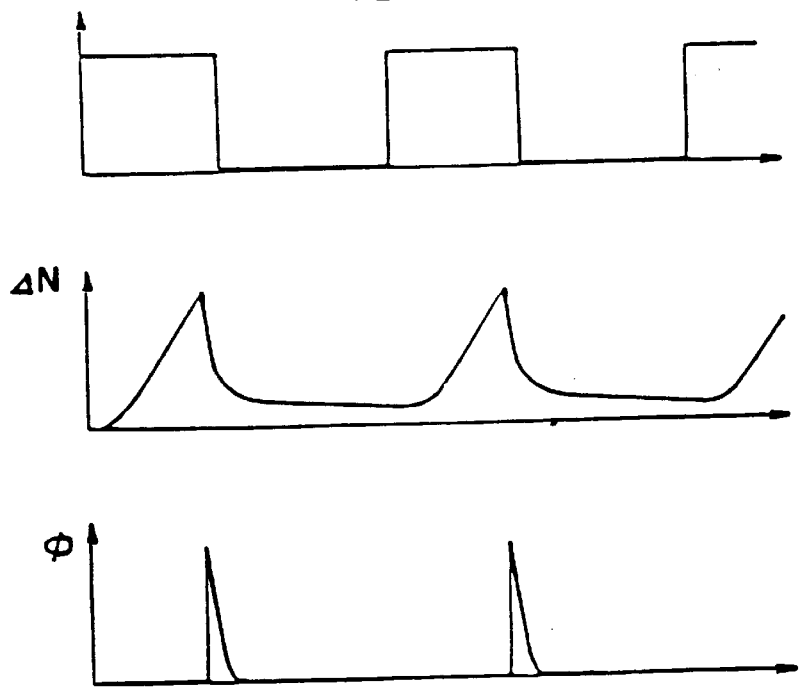

FIG. 10(a) is a diagram showing the relationship in which a period T of the continuous pulse supplied to the semiconductor laser satisfies the condition that $\tau_{FL} < T-\tau$. In the present expression, $\tau_{FL}$ indicates the life of fluorescence, and $\tau$ indicates the width of the pulse.

In contrast to FIG. 10(a), FIG. 10(b) is a diagram showing the relationship in which the period T of the continuous pulse supplied to the semiconductor laser satisfies the condition that $\tau_{FL} > T-\tau$.

It can be understood from FIG. 10(b) that a new inverted population is added to the remaining inverted population by applying the next pulse to the semiconductor laser during $\tau_{FL}$ (life of fluorescence), whereby only light having the maximum light intensity can be effectively produced on a continual basis.

Figure 7:
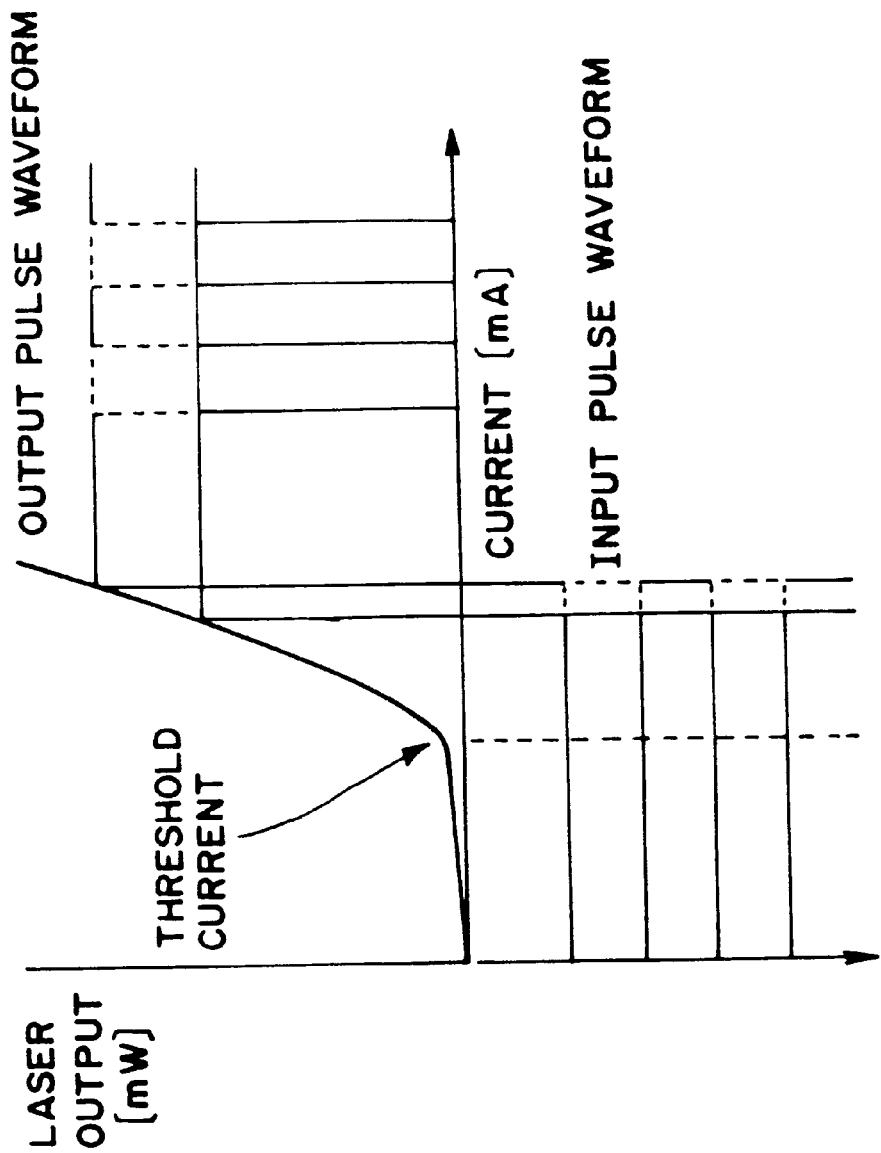
FIG. 7 is a diagram for describing the relationship between an input pulse of a laser light source and the quantity of light emitted from the laser beam emitting apparatus.

The relationship between an input pulse of the laser light source 100 and the quantity of light emitted from the laser beam emitting apparatus 1000 will further be explained based on FIG. 7.

When the input pulse of the laser light source 100 exceeds a threshold current, the quantity of light emitted from the laser beam emitting apparatus 1000 increases nonlinearly. Thus, if the peak value of the input pulse current supplied to the laser light source 100 is defined as a rated value of the laser light source 100 and the duty ratio and period of the input pulse are controlled, then the quantity of a laser beam or light can be varied in a state in which the laser has been oscillated with most efficiency.

Figure 2:
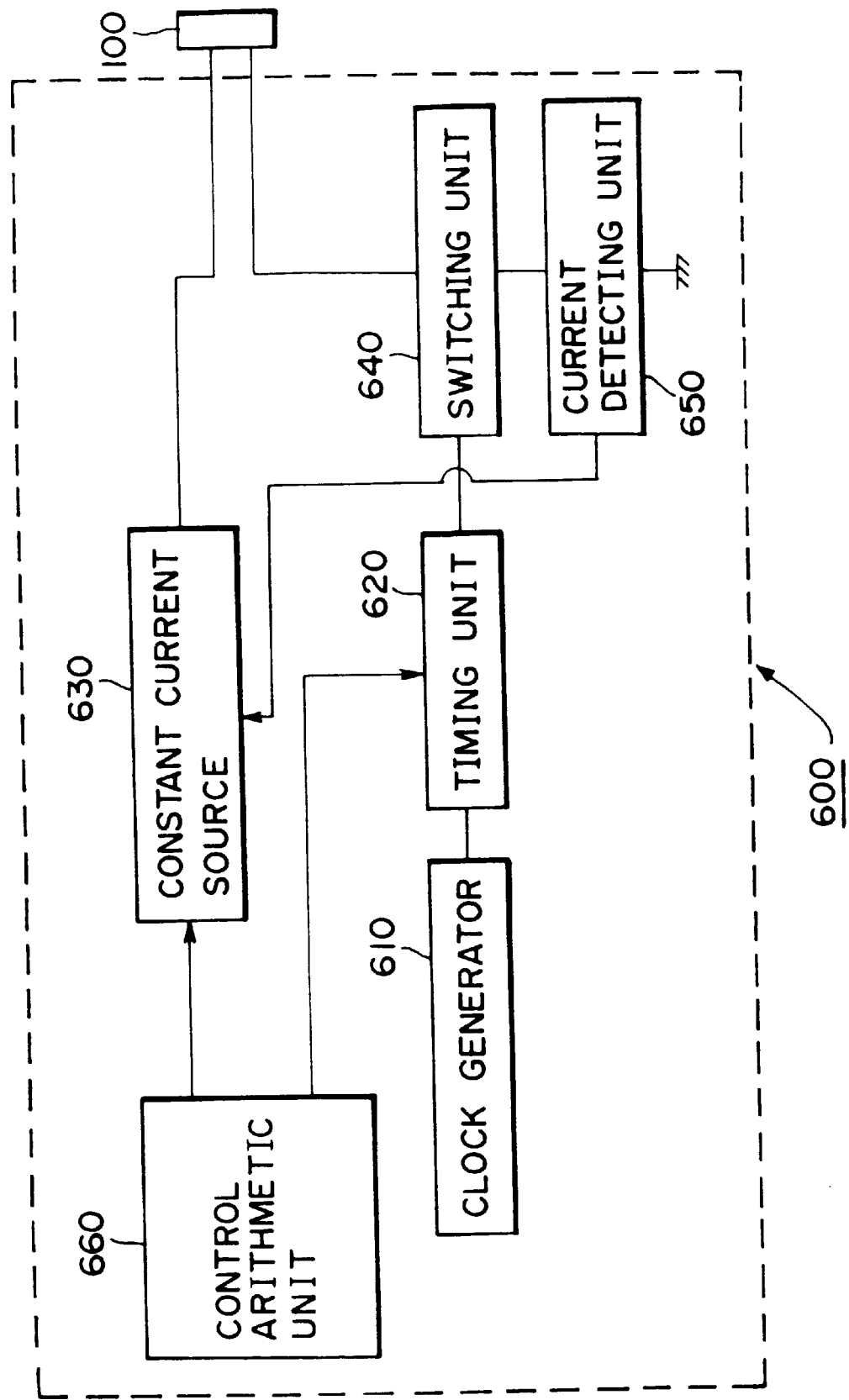
FIG. 2 is a diagram for explaining an electrical configuration of a laser driving means.

The laser driving means 600 employed in the present embodiment will next be described in detail based on FIG. 2.

The laser driving means 600 comprises a clock generator 610, a timing unit 620, a constant current source 630, a switching unit 640, a current detecting unit 650 and a control arithmetic unit 660.

The clock generator 610 is an oscillator for generating a clock used as the reference.

The timing unit 620 is used to set the time and period required for the laser light source 100 to emit light, based on the reference clock generated from the clock generator 610.

The constant current source 630 is used to supply a rated current to the laser light source 100 and to set a current used up by the laser light source 100, which is detected by the current detecting unit 650, to the rated current at all times.

The switching unit 640 is used to switch the current supplied to the laser light source 100 by switching, based on a signal outputted from the timing unit 620.

The current detecting unit 650 is used to detect a current flowing in the laser light source 100. Any current detecting means may by adopted if ones capable of detecting the current flowing in the laser light source 100 are used.

The control arithmetic unit 660 is used to send a control signal to the timing unit 620 and the constant current source 630 and thereby supply a desired drive signal to the laser light source 100.

The laser driving means 600 of the laser beam emitting apparatus 1000 according to the present embodiment constructed as described above can form a drive signal to be sent to the laser light source 100, based on the control signal outputted from the control arithmetic unit 660.

The drive signal produced by the laser driving means 600 will next be described in detail.

First Drive Signal

A first drive signal is used to control and drive the laser light source 100 under the control of the period of a pulse thereof to thereby adjust the quantity of light emitted from the laser beam emitting apparatus 1000.

Figure 3:
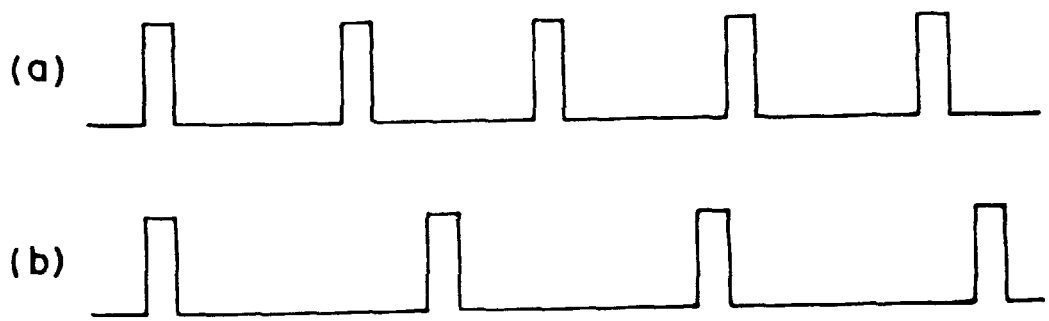
FIG. 3 is a diagram for explaining a first drive signal.

FIGS. 3(a) and 3(b) respectively show a first drive signal produced by the laser driving means 600. In the fist drive signal, the period of the pulse thereof is varied. Namely, when it is desired to increase the quality of light emitted from the laser beam emitting apparatus 1000, the cycle or period of the pulse thereof is rendered short and an effective value of the drive signal supplied to the laser light source 100 is increased, as shown in FIG. 3(a). As a result, the quantity of light emitted from the laser beam emitting apparatus 1000 increases.

On the other hand, when it is desired to reduce the quantity of light emitted from the laser beam emitting apparatus 1000, the period of the pulse of the drive signal is rendered long and the effective value of the drive signal supplied to the laser light source 100 is reduced, as shown in FIG. 3(b). As a result, the quantity of light emitted from the laser beam emitting apparatus 1000 is decrease.

Thus, the laser driving means 600 can change the drive signal supplied to the laser light source 100 to adjust the quantity of light emitted from the laser beam emitting apparatus 1000.

Incidentally, the period of the pulse of the first drive signal is a few 100 KHz but may suitably be set.

Second Drive Signal

A second drive signal is used to control and drive the laser light source 100 under the control of the duty ratio of a pulse thereof to thereby adjust the quantity of light emitted from the laser beam emitting apparatus 1000.

Figure 4:
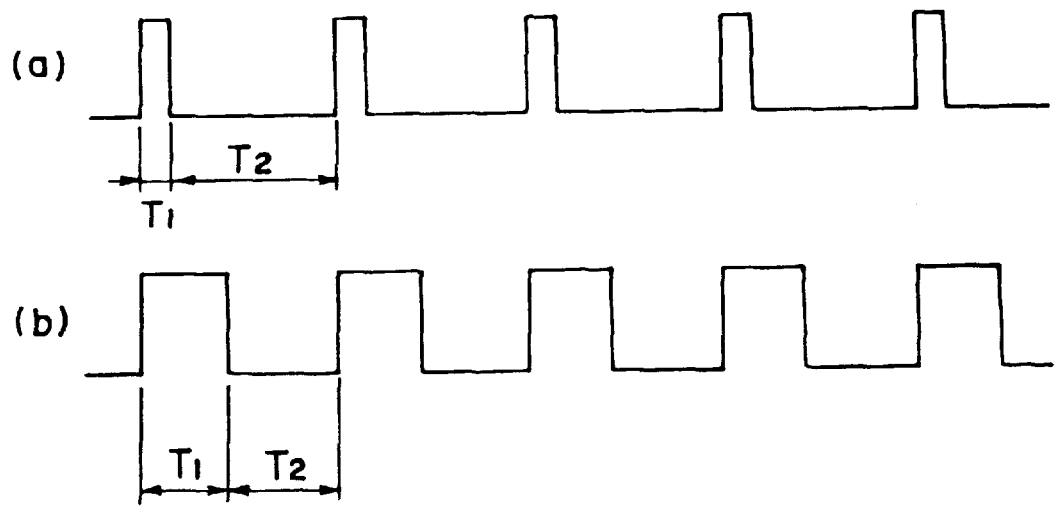
FIG. 4 is a diagram for explaining a second drive signal.

FIGS. 4(a) and 4(b) respectively show a second drive signal formed by the laser driving means 600, in which the duty ratio of a pulse thereof is varied in a state in which the cycle or period of the pulse remains unchanged. Namely, the duty ratio corresponding to the ratio between a time $(T_1)$ required to hold ON the drive signal supplied to the laser light source 100 and a time $(T_2)$ required to hold OFF the drive signal is changed.

Namely, when it is desired to increase the quantity of light emitted from the laser beam emitting apparatus 1000, $(T_1)/(T_1+T_2)$ is increased and the time required to hold ON the drive signal supplied to the laser light source 100 is rendered long, as shown in FIG. 4(a), whereby the quantity of light emitted from the laser beam emitting apparatus 1000 can be increased.

On the other hand, when it is desired to decrease the quantity of light emitted from the laser beam emitting apparatus 1000, $(T_1)/(T_1+T_2)$ is reduced and the time required to hold ON the drive signal supplied to the laser light source 100 is rendered short, as shown in FIG. 4(b), whereby the quantity of light emitted from the laser beam emitting apparatus 1000 can be decrease.

Thus, the laser driving means 600 changes the time required to drive the drive signal supplied to the laser light source 100 to vary the duty ratio of the pulse thereof, thereby making it possible to adjust the quantity of light emitted from the laser beam emitting apparatus 1000.

Incidentally, the period of the pulse of the second drive signal is a few 100 KHz but may suitably be set.

Third Drive Signal

A third drive signal is used to control the time required to emit an optical or lightwave pulse pumped by the laser light source 100. Namely, the third drive signal is used to control and drive the laser light source 100 to vary the time required to emit the pumped lightwave pulse so that the duty ratio of the pumping pulse is changed, thereby adjusting the quantity of light emitted from the laser beam emitting apparatus 1000.

Figure 5:
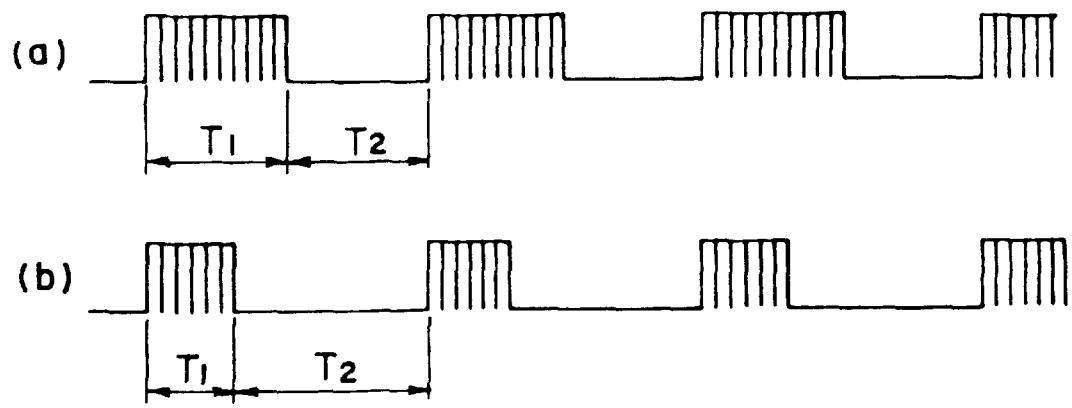
FIG. 5 is a diagram for explaining a third drive signal.

FIGS. 5(a) and 5(b) respectively show a third drive signal created by the laser driving means 600, in which a plurality of pulses are continuously driven to form a pumping pulse. The second drive signal is equivalent to one in which the duty ratio of the pumping pulse is varied in a state in which the cycle or period of the pumping pulse remains unchanged. The duty ratio corresponding to the ratio between a time $(T_1)$ required to pump the lightwave pulse and a time $(T_2)$ required to hold OFF the lightwave pulse is varied.

Namely, when it is desired to increase the quantity of light emitted from the laser beam emitting apparatus 1000, $(T_1)/(T_1+T_2)$ is made great and the pumping time is rendered long, as shown in FIG. 5(a). As a result, the quantity of light emitted from the laser beam emitting apparatus 1000 can be increased.

On the other hand, when it is desired to decrease the quantity of light emitted from the laser beam emitting apparatus 1000, $(T_1)/(T_1+T_2)$ is reduced and the pumping time is rendered short, as shown in FIG. 5(b). As a result, the quantity of light emitted from the laser beam emitting apparatus 1000 can be decrease.

Thus, the laser driving means 600 varies the time required to continuously drive the drive signal to be supplied to the laser light source 100 to change the duty ratio of the pumping pulse thereof, thereby making it possible to adjust the quantity of light emitted from the laser beam emitting apparatus 1000.

Incidentally, the period of the pulse of the third drive signal is a few 100 KHz but may suitably be set.

Fourth Drive Signal

A fourth drive signal is used to control the emission period of an optical or lightwave pulse subjected to pumping by the laser light source 100. Namely, the fourth drive signal is used to control and drive the laser light source 100 to vary the emission period of the pumped lightwave pulse so that the period of the pumping pulse is changed, thereby adjusting the quantity of light emitted from the laser beam emitting apparatus 1000.

FIGS. 6(a) and 6(b) respectively show a fourth drive signal created by the laser driving means 600, in which a plurality of pulses are continuously driven to form a pumping pulse. The quantity of light emitted from the laser beam emitting apparatus 1000 can be adjusted by varying the period of the pumping pulse.

Namely, when it is desired to increase the quantity of light emitted from the laser beam emitting apparatus 1000, the period of the pumping pulse is reduced and an effective time interval subjected to pumping is rendered long, as shown in FIG. 6(a). As a result, the quantity of light emitted from the laser beam emitting apparatus 1000 can be increased.

Figure 6:
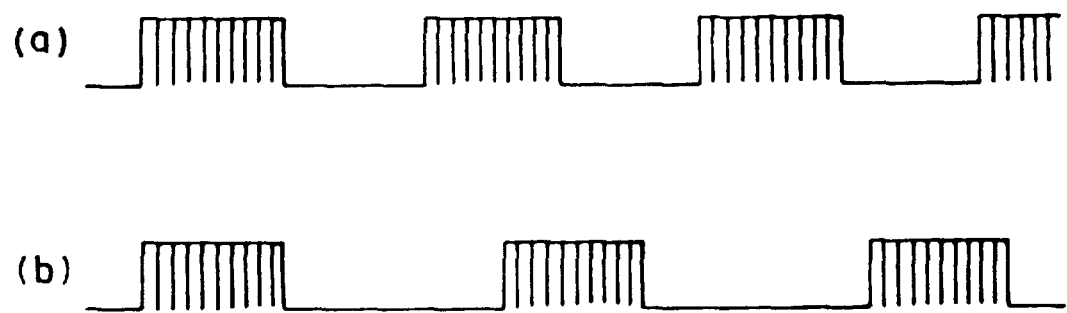
FIG. 6 is a diagram for explaining a fourth drive signal.

On the other hand, when it is desired to reduce the quantity of light emitted from the laser beam emitting apparatus 1000, the period of the pumping pulse is made great and the effective time interval subjected to pumping is rendered short, as shown in FIG. 6(*b*). As a result, the quantity of light emitted from the laser beam emitting apparatus 1000 can be decrease.

Thus, the laser driving means 600 varies the period required to continuously drive the drive signal to be supplied to the laser light source 100 to change the period of the pumping pulse thereof, thereby making it possible to adjust the quantity of light emitted from the laser beam emitting apparatus 1000.

Incidentally, the period of the rectangular pulse of the fourth drive signal is a few 100 KHz but may suitably be set.

Although each of the first through fourth drive signals produced by the laser driving means 600 is composed of the rectangular pulse or the pumping pulse formed by continuously emitting the rectangular pulse, it is not necessarily limited to the rectangular pulse and may use an attenuated pulse or the like.

Further, when the input pulse of the laser light source 100 exceeds a threshold current, the quantity of light emitted from the laser beam emitting apparatus 1000 increases nonlinearly as shown in FIG. 7. Thus, if the input pulse of the laser light source 100 is controlled, then the quantity of laser light can be varied in a state in which the laser has been oscillated with most efficiency.

Figure 11:
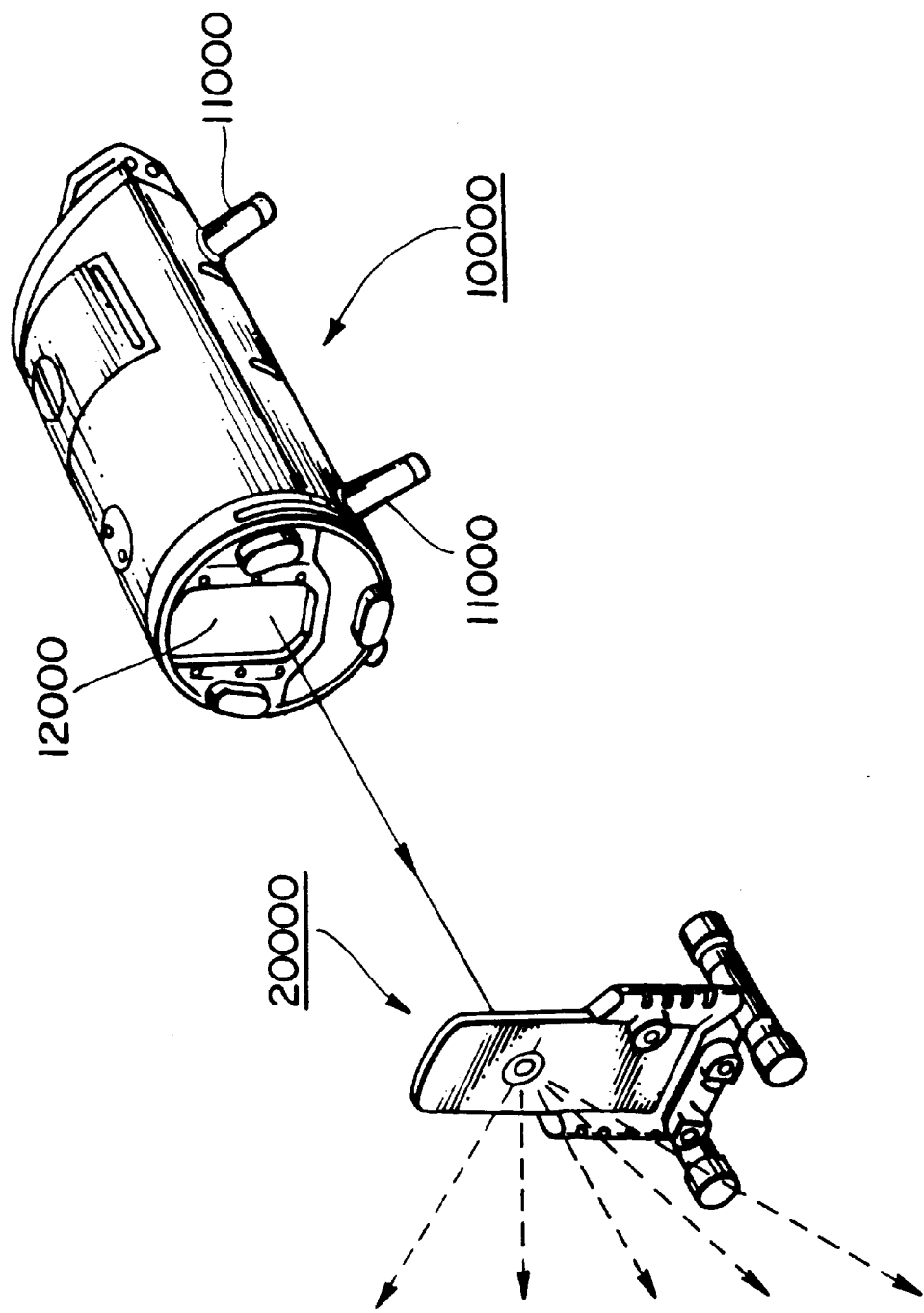
FIG. 11 is a diagram showing an example in which the laser beam emitting apparatus according to the present embodiment is applied to a pipe laser.
Figure 12:
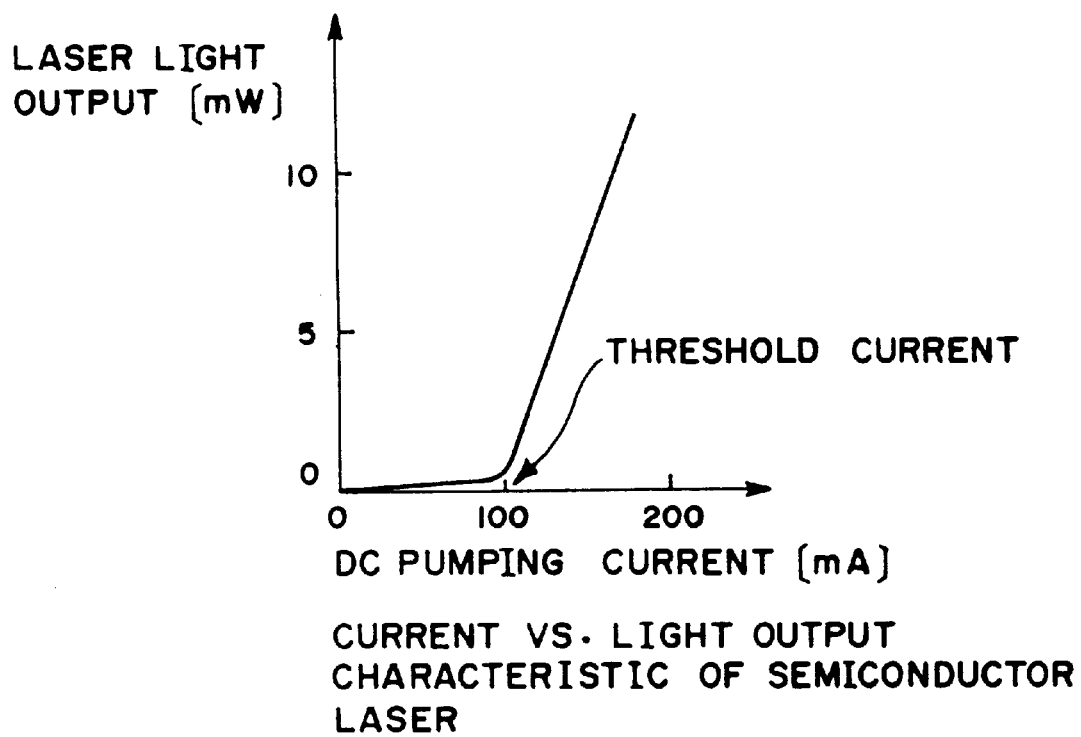
FIG. 12 is a diagram for describing a prior art.
Figure 13:
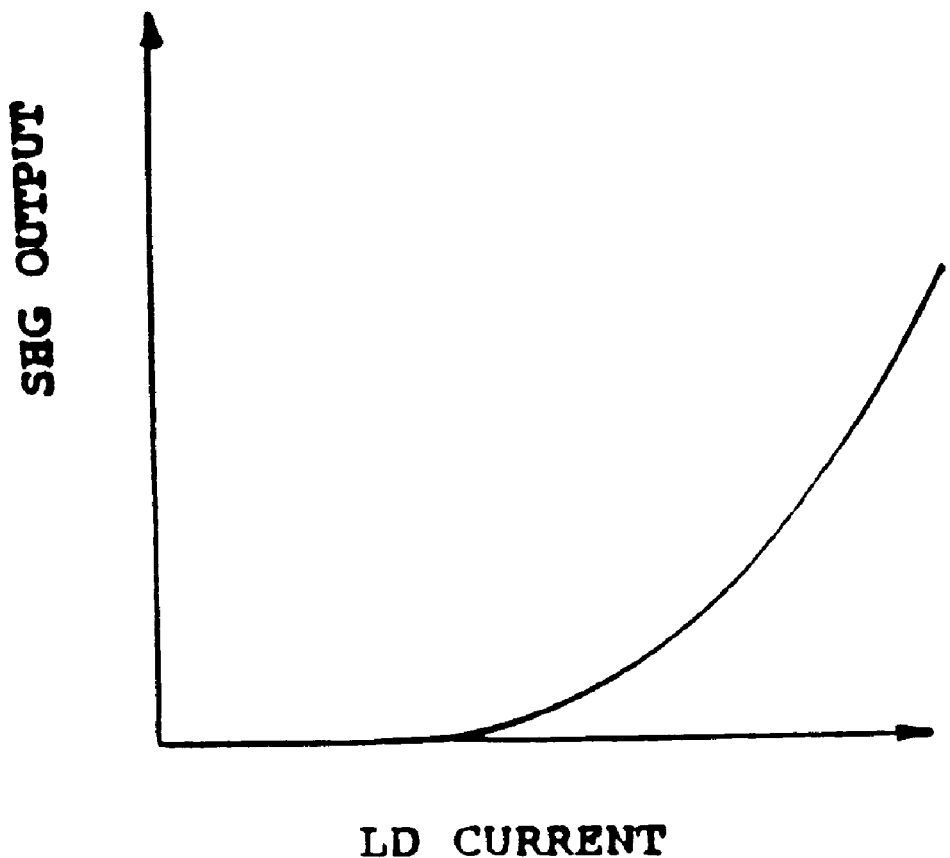
FIG. 13 is a diagram for describing the prior art.

A pipe laser 10000, which applies the laser beam emitting apparatus 1000 according to the present embodiment, will next be described with reference to FIG. 11.

The pipe laser 10000 is cylindrical in shape and is supported by four support legs 11000, 11000, . . . . The laser beam emitting apparatus 1000 is provided inside the pipe laser 10000 so as to be swingable in two directions corresponding to the upward and downward directions and the horizontal direction. The laser beam emitting apparatus 1000 is constructed so as to apply a laser beam in two directions corresponding to the horizontal and vertical directions.

A light projection window 12000 covered with glass is constitute in the front of the pipe laser 10000. The laser light or beam emitted from the laser beam emitting apparatus 1000 is applied through the light projection window 12000.

Further, the laser beam emitted from the pipe laser 10000 is made visible by a target 20000 so that its position can be indicated. Incidentally, the target 2000 is a translucent material and diffuses the laser beam and presents it in visible form. Thus, the position of the laser beam can be confirmed from the front and rear.

When the pipe laser 10000 is used under the sunlight in the daytime, the quantity of light emitted from the laser beam emitting apparatus 1000 can be increased to improve visibility. On the other hand, when the pipe laser 10000 is used indoors, for example, the quantity of light emitted from the laser beam emitting apparatus 1000 can be reduced because it is not light as compared with the use of the pipe laser 10000 under the sunlight. When the pipe laser 10000 is used in a dark place such as an underground or the like, the quantity of light emitted from the laser beam emitting apparatus 1000 can be further reduced to provide less power consumption.

The present invention constructed as described above can bring about an advantageous effect in that since an optical resonator is composed of at least a laser crystal and an output mirror, a laser light source pumps the optical resonator, and a pulse driving means drives the laser light source and changes the period and duty ratio of a drive pulse so as to control a laser output produced from a laser beam emitting apparatus, the quantity of a laser beam can be varied in a state in which a laser has been oscillated with most efficiency.

Further, the pulse driving means employed in the present invention can continuously drive a drive pulse to form a pumping pulse and can also change the duty ratio of the pumping pulse so as to control the laser output of the laser beam emitting apparatus. Moreover, the pulse driving means can also change the period of the pumping pulse so as to control the laser output of the laser beam emitting apparatus.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A laser beam emitting apparatus comprising:

an optical resonator composed of at least a laser crystal and an output mirror, said optical resonator having a non-linear optical means inserted therein for generating a second harmonic;

a laser light source for pumping said optical resonator; and pulse driving means for driving said laser light source, wherein said pulse driving means includes means for changing a period of a drive pulse, to thereby control a laser output produced from said laser beam emitting apparatus such that the quantity of output laser light varies inversely with the period of the drive pulse.

2. A laser beam emitting apparatus comprising:

an optical resonator composed of at least a laser crystal and an output mirror, said optical resonator having a non-linear optical means inserted therein for generating a second harmonic;

a laser light source for pumping said optical resonator; and pulse driving means for driving said laser light source, wherein said pulse driving means includes means for changing a duration of time for which a drive pulse is applied, to thereby control a laser output produced from said laser beam emitting apparatus such that the quantity of output laser light varies directly with said duration for which the drive pulse is applied.

3. A laser beam emitting apparatus comprising:

an optical resonator composed of at least a laser crystal and an output mirror, wherein said optical resonator has a non-linear optical means inserted therein for generating a second harmonic;

a laser light source for pumping said optical resonator; and pulse driving means for driving said laser light source, wherein said pulse driving means includes means for continuously driving a drive pulse to form a pumping pulse and for changing a duration of time for which the pumping pulse is applied, to thereby control a laser output produced from said laser beam emitting apparatus such that the quantity of output laser light varies directly with said duration for which the pumping pulse is applied.

4. A laser beam emitting apparatus comprising:

an optical resonator composed of at least a laser crystal and an output mirror, wherein said optical resonator has a non-linear optical means inserted therein for generating a second harmonic;

a laser light source for pumping said optical resonator; and pulse driving means including means for driving said laser light source, wherein said pulse driving means includes means for continuously driving a drive pulse to form a pumping pulse and for changing a period of the pumping pulse, to thereby control a laser output produced from said laser beam emitting apparatus such that the quantity of output laser light varies inversely with the period of the drive pulse.

5. A method of driving a laser light source for pumping an optical resonator comprising at least a laser crystal and an output mirror, comprising the steps of:

supplying a non-linear optical means in said optical resonator for generating a second harmonic and changing a period of a drive pulse for driving the laser light source, thereby controlling a laser output such that the quantity of output laser light varies inversely with the period of the drive pulse.

6. A method of driving a laser light source for pumping an optical resonator comprising at least a laser crystal and an output mirror, comprising the steps of:

supplying a non-linear optical means in said optical resonator for generating a second harmonic and changing a duration for which a drive pulse is applied for driving the laser light source, thereby controlling a laser output such that the quantity of output laser light varies directly with said duration for which the drive pulse is applied.

7. A method of driving a laser light source for pumping an optical resonator comprising at least a laser crystal and an output mirror, comprising the steps of:

supplying a non-linear optical means in said optical resonator for generating a second harmonic;

continuously driving a drive pulse for driving the laser light source to thereby form a pumping pulse; and changing a duration for which the pumping pulse is applied, thereby controlling a laser output such that the quantity of output laser light varies directly with said duration for which the pumping pulse is applied.

8. A method of driving a laser light source for pumping an optical resonator comprising at least a laser crystal and an output mirror, comprising the steps of:

supplying a non-linear optical means in said optical resonator for generating a second harmonic;

continuously driving a drive pulse for driving the laser light source to thereby form a pumping pulse; and changing the period of the pumping pulse, thereby controlling a laser output such that the quantity of output laser light varies inversely with the period of the pumping pulse.

* * * * *